US012695081B2

(12) United States Patent
Uka et al.

(10) Patent No.: US 12,695,081 B2
(45) Date of Patent: Jul. 28, 2026

(54) POSITIVE ELECTRODE FOR SECONDARY BATTERY, METHOD FOR PRODUCING SAME, AND SECONDARY BATTERY

(71) Applicant: Panasonic Intellectual Property Management Co., Ltd., Kadoma (JP)

(72) Inventors: Youichirou Uka, Hyogo Ken (JP);
Rina Yamamoto, Hyogo Ken (JP);
Yoshio Kato, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 18/697,323

(22) PCT Filed: Sep. 27, 2022

(86) PCT No.: PCT/JP2022/035824
§ 371 (c)(1),
(2) Date: Mar. 29, 2024

(87) PCT Pub. No.: WO2023/054304
PCT Pub. Date: Apr. 6, 2023

(65) Prior Publication Data
US 2024/0396000 A1     Nov. 28, 2024

(30) Foreign Application Priority Data
Sep. 30, 2021     (JP) ................................. 2021-162332

(51) Int. Cl.
H01M 4/04          (2006.01)
H01M 4/36          (2006.01)
(Continued)

(52) U.S. Cl.
CPC ......... H01M 4/0404 (2013.01); H01M 4/364 (2013.01); H01M 4/366 (2013.01);
(Continued)

(58) Field of Classification Search
None
See application file for complete search history.

(56) References Cited

U.S. PATENT DOCUMENTS

2014/0370337 A1     12/2014   Matsui et al.
2017/0256776 A1      9/2017   Saka et al.
(Continued)

FOREIGN PATENT DOCUMENTS

EP          3588630 A1      1/2020
JP        2012-221855 A     11/2012
(Continued)

OTHER PUBLICATIONS

International Search Report dated Nov. 1, 2022, issued in counterpart International Application No. PCT/JP2022/035824 (5 pages).
(Continued)

*Primary Examiner* — Austin Murata
(74) *Attorney, Agent, or Firm* — WHDA, LLP

(57)          ABSTRACT

A positive electrode for a secondary battery including a positive electrode current collector, and a positive electrode mixture layer containing a positive electrode active material and disposed on a surface of the positive electrode current collector, in which the positive electrode mixture layer contains a first positive electrode active material, a second positive electrode active material crushable more easily than the first positive electrode active material, and when the positive electrode mixture layer is zoned into a first region and a second region having the same thickness, the first positive electrode active material is contained more in the first region than in the second region, and the second positive electrode active material is contained more in the second region than in the first region is used. The crack ratio of the positive electrode active material in the first region is smaller than that in the second region.

8 Claims, 2 Drawing Sheets

(51) Int. Cl.
 *H01M 4/62* (2006.01)
 *H01M 10/052* (2010.01)
 *H01M 4/02* (2006.01)
(52) U.S. Cl.
 CPC ........... *H01M 4/62* (2013.01); *H01M 10/052* (2013.01); *H01M 2004/021* (2013.01); *H01M 2004/028* (2013.01)

(56) References Cited

U.S. PATENT DOCUMENTS

| | | | |
|---|---|---|---|
| 2018/0287152 A1* | 10/2018 | Yasumiishi | H01M 4/366 |
| 2019/0330072 A1* | 10/2019 | Imanari | C01D 15/02 |
| 2020/0006767 A1* | 1/2020 | Du | H01M 4/525 |
| 2020/0052291 A1 | 2/2020 | Song et al. | |
| 2021/0083286 A1 | 3/2021 | Kuroda et al. | |
| 2022/0376243 A1* | 11/2022 | Hayashi | H01M 4/525 |
| 2023/0047021 A1* | 2/2023 | Yamamoto | H01M 10/0525 |

FOREIGN PATENT DOCUMENTS

| | | | |
|---|---|---|---|
| JP | 2014-060142 A | | 4/2014 |
| JP | 2014-143063 A | | 8/2014 |
| JP | 2019-160573 A | | 9/2019 |
| WO | 2016/038438 A1 | | 3/2016 |
| WO | 2021/153397 A1 | | 8/2021 |
| WO | WO 2021/153397 | * | 8/2021 |

OTHER PUBLICATIONS

Extended (Supplementary) European Search Report dated Jun. 23, 2025, issued in EP Application No. 22876171.4. (8 pages).
Office Action dated Dec. 3, 2025, issued in counterpart IN Application No. 202447029089.(6 pages).

* cited by examiner

POSITIVE ELECTRODE FOR SECONDARY BATTERY, METHOD FOR PRODUCING SAME, AND SECONDARY BATTERY

CROSS REFERENCE TO RELATED APPLICATIONS

This Application is the National Stage of International Application No. PCT/JP2022/035824, filed on Sep. 27, 2022, which claims priority from Application No. 2021-162332 filed on Sep. 30, 2021 in Japan. The entire contents of these applications are incorporated herein by reference in their entirety.

TECHNICAL FIELD

The present disclosure relates to a secondary battery, and particularly relates to an improvement on a positive electrode used in a secondary battery.

BACKGROUND ART

Secondary batteries, especially lithium-ion secondary batteries, have high output and high energy density and are, therefore, expected as power sources for small consumer applications, power storage devices, and electric cars.

Patent Literature 1 proposes a positive electrode for a secondary battery, including a positive electrode current collector, and a positive electrode mixture layer containing a positive electrode active material and disposed on a surface of the positive electrode current collector. The positive electrode mixture layer containing a first positive electrode active material having a compressive strength of 400 MPa or more, and a second positive electrode active material having a compressive strength of 250 MPa or less. The literature says that, when the positive electrode mixture layer is zoned into a first region and a second region having the same thickness, by differing the contents of the first positive electrode active material and the second positive electrode active material between the first region and the second region, in a secondary battery using this positive electrode for a secondary battery, high energy density and high cycle characteristics can be both achieved.

CITATION LIST

Patent Literature

Patent Literature 1: International Publication WO2021/153397

SUMMARY OF INVENTION

Technical Problem

In a secondary battery, however, further studies are necessary on achieving both high energy density and high cycle characteristics.

Solution to Problem

In view of the above, one aspect of the present disclosure relates to a positive electrode for a secondary battery, including: a positive electrode current collector; and a positive electrode mixture layer containing a positive electrode active material and disposed on a surface of the positive electrode current collector, wherein the positive electrode mixture layer contains a first positive electrode active material, and a second positive electrode active material crushable more easily than the first positive electrode active material, when the positive electrode mixture layer is zoned into a first region and a second region having the same thickness, the first positive electrode active material is contained more in the first region than in the second region, and the second positive electrode active material is contained more in the second region than in the first region, and a crack ratio of the positive electrode active material in the first region is smaller than a crack ratio of the positive electrode active material in the second region.

Another aspect of the present disclosure relates to a method for producing the above-described positive electrode for a secondary battery, the method including: a step of preparing a positive electrode current collector; and a step of disposing a positive electrode mixture layer including a first layer and a second layer, on a surface of the positive electrode current collector; the step of disposing the positive electrode mixture layer including a step of forming the second layer on the surface of the positive electrode current collector, and a step of forming the first layer on the second layer, wherein the first layer contains at least a first positive electrode active material, and the second layer contains at least a second positive electrode active material crushable more easily than the first positive electrode active material.

Still another aspect of the present disclosure relates to a secondary battery including: the above-described positive electrode for a secondary battery; a separator; a negative electrode facing the positive electrode for a secondary battery with the separator interposed between the positive electrode and the negative electrode; and a liquid electrolyte.

While the novel features of the invention are set forth particularly in the appended claims, the invention, both as to organization and content, will be better understood and appreciated, along with other objects and features thereof, from the following detailed description taken in conjunction with the drawings.

Advantageous Effects of Invention

According to the present disclosure, it is possible to realize a secondary battery in which high energy density and high cycle characteristics are both achieved.

DESCRIPTION OF EMBODIMENTS

Figure 1:
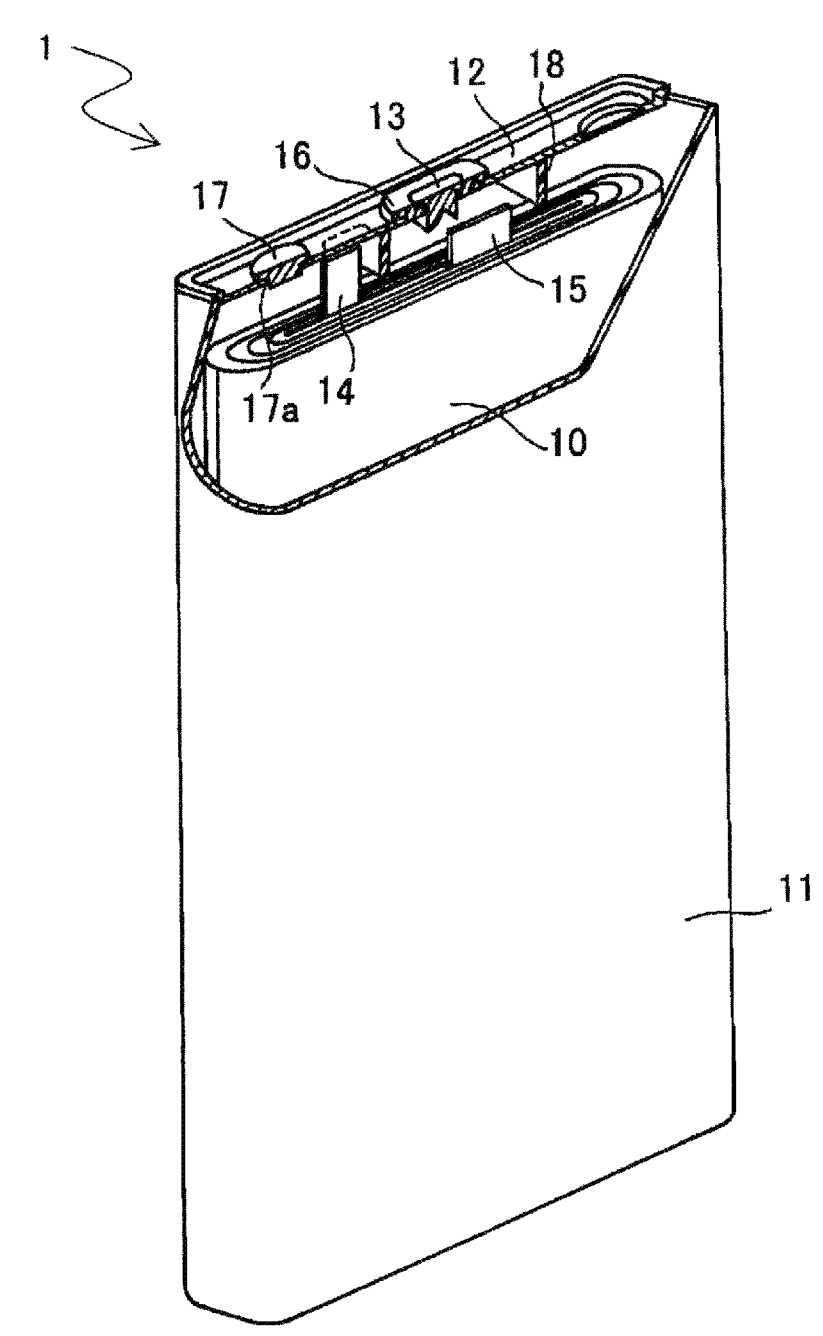
FIG. 1 A partially-cutaway schematic oblique view of a secondary battery according to one embodiment of the present disclosure.

Embodiments of the present disclosure will be described below by way of examples, but the present disclosure is not limited to the examples described below. In the following description, specific numerical values and materials are exemplified in some cases, but other numerical values and other materials may be adopted as long as the effects of the present disclosure can be obtained. In the present specification, the phrase "a numerical value A to a numerical value B" means to include the numerical value A and the numerical value B, and can be rephrased as "a numerical value A or more and a numerical value B or less." In the following description, when the lower and upper limits of numerical values related to specific physical properties, conditions, etc. are mentioned as examples, any one of the mentioned lower limits and any one of the mentioned upper limits can be combined in any combination as long as the lower limit is not equal to or more than the upper limit. When a plurality of materials are mentioned as examples, one kind of them may be selected and used singly, or two or more kinds of them may be used in combination.

The present disclosure encompasses a combination of matters recited in any two or more claims selected from plural claims in the appended claims. In other words, as long as no technical contradiction arises, matters recited in any two or more claims selected from plural claims in the appended claims can be combined.

In the following description, the term "comprise" or "include" is an expression including meanings of "comprise (or include)," "essentially consist of," and "consist of."

Secondary batteries include at least nonaqueous electrolyte secondary batteries such as lithium-ion batteries and lithium-metal secondary batteries, and all-solid-state batteries.

A positive electrode for a secondary battery according to an embodiment of the present disclosure includes a positive electrode current collector, and a positive electrode mixture layer containing a positive electrode active material and disposed on a surface of the positive electrode current collector. The positive electrode mixture layer contains a first positive electrode active material, and a second positive electrode active material. The crack ratio of the positive electrode active material in a first region is smaller than the crack ratio of the positive electrode active material in a second region.

Here, the crack ratio of the positive electrode active material is a proportion of the positive electrode active material having cracks or crushed in the whole positive electrode active material in a predetermined area of the positive electrode mixture layer, and can be determined by image analysis of a cross section of the positive electrode mixture layer, as described below.

When the positive electrode mixture layer is zoned into a first region and a second region having the same thickness, the first positive electrode active material is contained more in the first region than in the second region, and the second positive electrode active material is contained more in the second region than in the first region. In other words, the first positive electrode active material and the second positive electrode active material have a concentration distribution in the thickness direction of the positive electrode mixture layer. In the first region, the concentration of the first positive electrode active material is high, and in the second region, the concentration of the second positive electrode active material is high. Note that the concentration herein means the content by mass. The first region may contain substantially no second positive electrode active material. The second region may contain substantially no first positive electrode active material.

The positive electrode mixture layer has, for example, a laminated structure of a first layer and a second layer. The first layer contains one of the first and second positive electrode active materials more than the second layer, and the second layer contains the other one of the first and second positive electrode active materials more than the first layer. The first layer and the second layer may not necessarily have the same thickness. If there is a difference between the first layer and the second layer in the concentrations of the first positive electrode active material and the second positive electrode active material, when the whole of the first layer and the second layer is zoned into a first region and a second region having the same thickness, the concentrations of the first positive electrode active material and the second positive electrode active material differ between the first region and the second region.

The second positive electrode active material is crushable more easily than the first positive electrode active material. In other words, the positive electrode active material tends to have cracks or be crushed at its surface, due to the pressure applied during the production of a positive electrode. Therefore, the crack ratio in the second region containing much second positive electrode active material is greater than that in the first region containing much first positive electrode active material.

The first positive electrode active material is hardly crushed. Therefore, between the particles of the first positive electrode active material, gaps through which liquid electrolyte can flow are maintained even when the positive electrode active material expands and contracts during charging and discharging. Moreover, the first positive electrode active material hardly have cracks, and therefore, the formation of a new surface that causes an electrochemical reaction including a side reaction can be suppressed. As a result, the first positive electrode active material contributes to improving the cycle retention rate. However, with the first positive electrode active material only, it is not enough to improve the capacity in order to obtain a battery with high energy density.

In one attempt to obtain a secondary battery with high energy density, the applied amounts of the positive and the negative electrode active material have been increased, so that material mixture layers are formed thick. In this case, typically, the positive electrode mixture layer is rolled in the production process of a positive electrode. When the positive electrode mixture layer is rolled, the positive electrode active material particles are brought close to each other and are partially crushed, and fine particles generated by crushing can fill the gaps between the active material particles. By this, a higher energy density can be obtained. However, since the first positive electrode active material is hardly crushed, it is difficult to obtain a battery with high energy density by using the first positive electrode active material only.

On the other hand, the second positive electrode active material is crushable easily as compared to the first positive electrode active material. As a result of crushing, fine particles generated by crushing of the second positive electrode active material fill the gaps between the second positive electrode active material particles, or the second positive electrode active material is deformed to fill the gaps between the second positive electrode active material particles, and consequently, the loaded amount of the positive electrode active material per unit electrode area can be increased. Therefore, it is easy to obtain a secondary battery with high energy density. However, as a result of compression, it may become difficult for the liquid electrolyte to permeate into a deep part on the positive electrode current collector side of the positive electrode mixture layer, causing reduction in electrolyte permeability. This may result in reduction in cycle characteristics in some cases.

The positive electrode mixture layer contains a first positive electrode active material and a second positive electrode active material. In this case, by rolling, the second positive electrode active material is crushed or deformed to fill the gaps between the positive electrode active material particles, while gaps through which liquid electrolyte can flow are maintained between the particles of the first positive electrode active material. This can provide a positive electrode having high active material density while allowing the electrolyte permeability to be maintained high, and thus can achieve both high cycle characteristics and high energy density.

In addition, the positive electrode mixture layer has the first region and the second region differing in the contents of the first positive electrode active material and the second positive electrode active material. Therefore, the pressure applied to the positive electrode mixture layer during compression is dispersed, and the active material density in the positive electrode mixture layer can be appropriately increased. By this, a battery with high energy density can be obtained. This battery has favorable electrolyte permeability and is excellent in cycle characteristics.

The second positive electrode active material may be contained in the first region. The first positive electrode active material may be contained in the second region. In general, the first positive electrode active material and the second positive electrode active material can be distinguished by the differences in shape, size, and morphology based on a cross-sectional SEM photograph of the surface of the positive electrode mixture layer, or by performing compositional analysis (element mapping), but this is not a limitation.

The crack ratio in the first and the second region is calculated based on a SEM photograph of a cross section of the positive electrode mixture layer by a method as described below.

Within a predetermined region X of the cross-sectional photograph, an area S1 occupied by the positive electrode active material present in a particulate state without cracks is determined. Similarly, within the predetermined region X of the cross-sectional photograph, an area S2 occupied by the positive electrode active material present in a particulate state with cracks or in a crushed state is determined.

An area S1+S2 occupied by the whole positive electrode active material (regardless of whether they have cracks or are crushed) within the predetermined region X of the cross-sectional photograph can be approximately calculated by subtracting an area S3 of voids from an area S0 of the predetermined region X. When a material other than the positive electrode active material, such as a conductive material, can be identified in the cross-sectional photograph, an area S4 occupied by the material is included in the S3.

The crack ratio RC in the region X can be determined from the following equation.

$$RC = S2/(S1 + S2) = (S0 - S1 - S3)/(S0 - S3)$$

The area S0 of the region X is, for example, 100 µm by 100 µm. The crack ratio is preferably determined as an average value of the crack ratio RC determined based on the above equation, with respect to a plurality of (e.g., 10 or more) the regions X.

Figure 2:
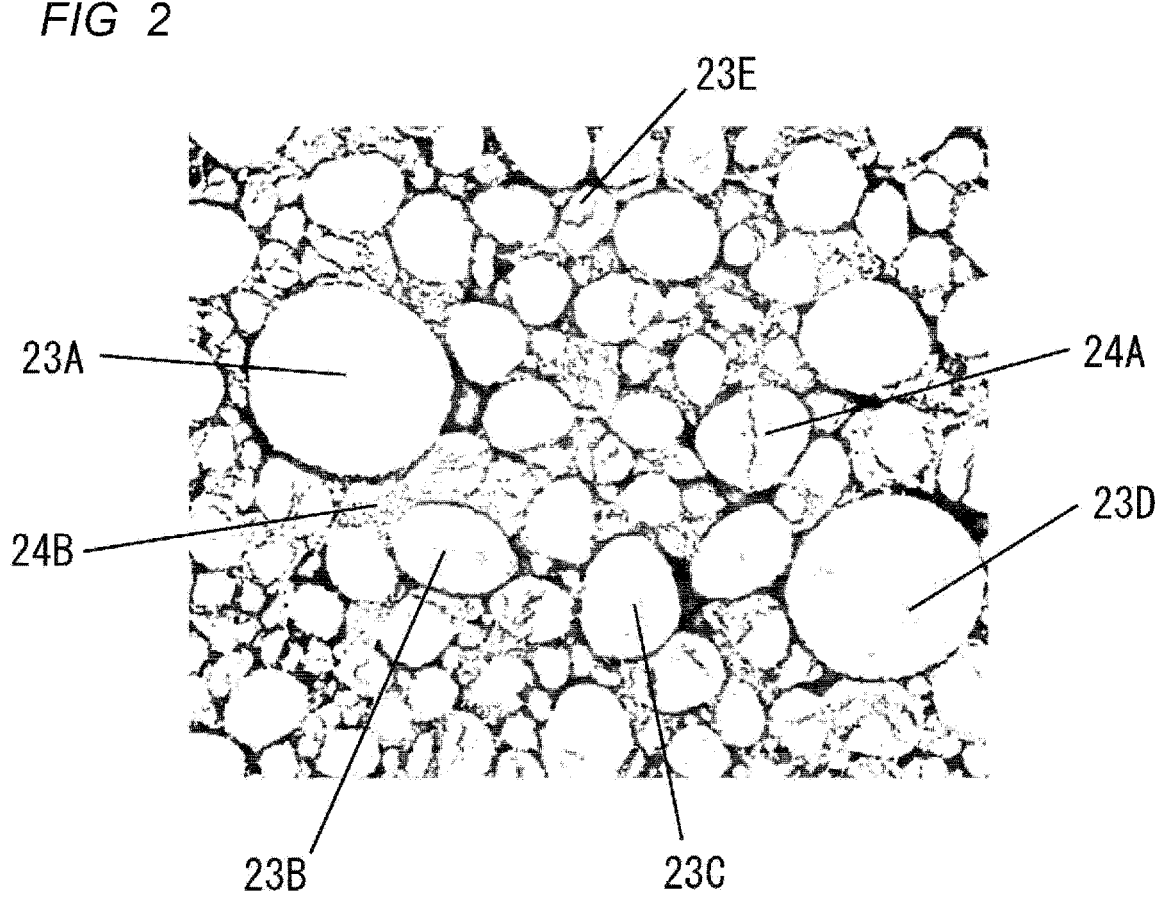
FIG. 2 A cross-sectional photograph of an enlarged partial region of a cross section of a positive electrode mixture layer of a positive electrode for a secondary battery.

FIG. 2 shows an example of a cross-sectional photograph of an enlarged partial region of a cross section of the positive electrode mixture layer of the positive electrode for a secondary battery in the present embodiment. The black areas in FIG. 2 indicate voids. Positive electrode active material particles present in a particulate state without cracks, and positive electrode active material particles present in a particulate state with cracks or in a crushed state are distributed within the positive electrode mixture layer.

In FIG. 2, positive electrode active material particles 23A to 23D are present in a particulate state without cracks, and at least part of the surface of the positive electrode active material particles is in contact with the voids (black areas). Although present in a particulate state, a positive electrode active material particle 24A has a crack. A positive electrode active material particle 24B is present in a crushed state, and fills the gap between the positive electrode active material particles 23A and 23B. A positive electrode active material particle 23E has a very small crack in part of the active material, but the crack ends at the center of the active material. Such a particle in which a crack is formed but the crack is not propagating from one end to the other end of the active material is regarded as a particle without cracks, because the increase in contact area with liquid electrolyte due to the crack is limited.

The crack ratio RC2 of the positive electrode active material in the second region is, for example, 1.2 times or more as large as the crack ratio RC1 of the positive electrode active material in the first region. The RC2 may be 1.5 times or more as large as the RC1. The crack ratio RC2 of the positive electrode active material in the second region is preferably 70% or less (0.7 or less). That is, the crack ratio is preferably 70% or less (0.7 or less) in both the first region and the second region.

The second region may be nearer to the positive electrode current collector than the first region. That is, the first region with a small crack ratio may be on the surface side. In this case, positive electrode active material particles crushed on their surface side are few, and there are gaps between the particles. Therefore, the surface of the positive electrode is prevented from being occluded when the positive electrode expands and contracts during discharging, and the liquid electrolyte can pass through the gaps present between the first positive electrode active material particles and enter into the second region. Therefore, the liquid permeability can be favorable, and the cycle retention rate can be improved.

The crack ratio can be controlled by dispersing two or more kinds of positive electrode active materials (first positive electrode active material and second positive electrode active material) differing in compressive strength, particle diameter, composition, etc., in the positive electrode mixture layer. The crack ratio can also be controlled by adjusting the pressure when rolling the positive electrode with the positive electrode mixture layer formed thereon. The higher the rolling pressure (linear pressure) is, the larger the crack ratio becomes.

As described above, in the case of forming a positive electrode mixture layer including a first layer and a second layer laminated together, the positive electrode may be rolled after a second layer (a lower layer on the current collector side) is formed. This can increase the crack ratio in the second layer on the current collector side. By forming a first layer (upper layer) afterward, a positive electrode for a secondary battery can be easily obtained in which the crack ratio in the second layer is smaller than that in the first layer, and the crack ratio of the positive electrode active material in the first region on the positive electrode surface side is smaller than that in the second region on the current collector side. In this case, in forming a first layer and a second layer, the same positive electrode mixture slurry may be used.

A method for producing the positive electrode for a secondary battery according to the present embodiment includes a step of preparing a positive electrode current collector, and a step of disposing a positive electrode mixture layer including a first layer and a second layer, on a surface of the positive electrode current collector. The step of disposing the positive electrode mixture layer includes a step of forming the second layer on the surface of the positive electrode current collector, and a step of forming the first layer on the second layer. The first layer contains at least a first positive electrode active material, and the second layer contains at least a second positive electrode active material which is crushable more easily than the first positive electrode active material. The method may further include a step of, after forming the second layer, compressing the second layer together with the positive electrode current collector.

The ratio of a D90 diameter to a D10 diameter of the first positive electrode active material is preferably larger than a ratio of a D90 diameter to a D10 diameter of the second positive electrode active material. Here, the D90 diameter and the D10 diameter are particle diameters at 90% cumulative volume and 10% cumulative volume, respectively, in a volume-based particle size distribution, and can be measured by, for example, a laser diffraction and scattering method. The larger the ratio of the D90 diameter to the D10 diameter is, the broader the particle size distribution of the positive electrode active material particles is, and the larger the variations in particle diameter are.

When, in the first layer (first region) on the positive electrode surface side, the first positive electrode active material with large variations in particle diameter is much contained, the positive electrode active material is uniformly compressed, leading to a reduced crack occurrence rate.

In the positive electrode mixture layer, the particle diameters of the first positive electrode active material and the second positive electrode active material (at least for those that are not crushed) can be determined by identifying the contour of an active material particle from a SEM photograph of a cross section of the positive electrode, to select a plurality of (e.g., 20 or more) active material particles, and measuring the diameter of a circle (equivalent circle) having the same area as the contour area of each of the active material particles, to determine an average value thereof.

Next, the secondary battery according to the embodiment of the present disclosure will be described in detail, with a nonaqueous electrolyte secondary battery taken as an example. The secondary battery includes, for example, a positive electrode, a negative electrode, a liquid electrolyte, and a separator as described below.

[Positive Electrode]

The positive electrode includes a positive electrode current collector, and a positive electrode mixture layer formed on a surface of the positive electrode current collector and containing a positive electrode active material. For the positive electrode, the aforementioned positive electrode for a secondary battery having the first positive electrode mixture layer and the second positive electrode mixture layer is used. The first and second positive electrode mixture layers can be each formed by, for example, applying a positive electrode slurry in which a positive electrode mixture including a positive electrode active material, a binder, and the like is dispersed in a dispersion medium, onto a surface of the positive electrode current collector, followed by drying. The dry applied film may be rolled as necessary. The positive electrode mixture layer may be formed on one surface or both surfaces of the positive electrode current collector.

As the positive electrode active material (first positive electrode active material and second positive electrode active material), a lithium-containing composite oxide having a layered rock-salt type crystal structure containing lithium and a transition metal can be used. Specifically, the lithium-containing composite oxide may be, for example, $Li_aNi_{1-x-y}Co_xM_yO_2$ where $0<a\leq1.2$, $0\leq x\leq0.1$, $0\leq y\leq0.1$, $0<x+y\leq0.1$, and M is at least one selected from the group consisting of Na, Mg, Sc, Y, Mn, Fe, Cu, Zn, Al, Cr, Pb, Sb, and B. In view of the stability of the crystal structure, Al may be contained as the element represented by M. The value a representing the molar ratio of lithium increases and decreases during charging and discharging. Such a composite oxide is exemplified by a lithium-nickel-cobalt-aluminum composite oxide (e.g., $LiNi_{0.88}Co_{0.09}Al_{0.03}O_2$, $LiNi_{0.9}Co_{0.05}Al_{0.05}O_2$, $LiNi_{0.91}Co_{0.06}Al_{0.03}O_2$).

The first positive electrode active material and the second positive electrode active material are different in the crushability (strength) as described above. However, the material and composition may be the same or different between the first positive electrode active material and the second positive electrode active material. Another positive electrode active material other than the first and second positive electrode active materials may be contained in a predetermined amount in the positive electrode mixture layer.

In the following, a method for producing a lithium-containing composite oxide will be described, with a composite oxide mainly composed of lithium, nickel, and cobalt taken as an example.

The method for producing a lithium-containing composite oxide includes: for example, a composite hydroxide synthesis step of obtaining a Ni—Co—Al composite hydroxide or a Ni—Co—Mn composite hydroxide and the like; a raw material mixing step of mixing the composite hydroxide and a lithium compound, to obtain a raw material mixture; and a firing step of firing the raw material mixture to obtain composite oxide particles.

In the composite hydroxide synthesis step, for example, using a co-precipitation method, an alkaline solution, such as sodium hydroxide, is added dropwise to a solution of a metal salt containing Ni, Co, Al (or Mn), etc. under stirring, until the pH is adjusted to the alkaline side (e.g., 8.5 to 11.5), thereby to allow a Ni—Co—Al composite hydroxide or a Ni—Co—Mn composite hydroxide to be deposited (co-precipitated). The composite hydroxide synthesis step may include an aging step of, after the deposition of a composite hydroxide, leaving the composite hydroxide to stand as it is in the reaction solution.

In the raw material mixing step, for example, the above composite hydroxide is mixed with a lithium compound, such as lithium hydroxide, lithium carbonate, or lithium nitrate, to obtain a raw material mixture. By adjusting the mixing ratio between the composite hydroxide and the lithium compound, it is possible to control the properties of the finally obtained composite oxide particles. The mixing ratio between the composite hydroxide and the lithium compound may be such that metal elements (Ni+Co+Al or Mn): Li falls in the range of 1.0:1.02 to 1.0:1.2 by molar ratio.

In the firing step, for example, the raw material mixture is fired in an oxygen atmosphere, to obtain composite oxide particles. By adjusting the firing temperature of the raw material mixture, too, it is possible to control the properties of the finally obtained composite oxide particles. The firing temperature of the raw material mixture may be set, for example, in the range of 750° C. or more and 1100° C. or less. The firing time is preferably 20 hours to 150 hours, more preferably 20 hours to 100 hours. When the firing time of the composite oxide particles exceeds 150 hours, as compared to when 150 hours or less, for example, a deterioration in material physical properties or electrochemical characteristics may be caused in some cases.

The form and the thickness of the positive electrode current collector may be respectively selected from the forms and the ranges corresponding to those of the negative electrode current collector. The material of the positive electrode current collector may be, for example, stainless steel, aluminum, an aluminum alloy, titanium, and the like.

[Negative Electrode]

The negative electrode includes, for example, a negative electrode current collector, and a negative electrode active material layer formed on a surface of the negative electrode current collector. The negative electrode active material layer can be formed by, for example, applying a negative electrode slurry in which a negative electrode mixture including a negative electrode active material, a binder, and the like is dispersed in a dispersion medium, onto a surface of the negative electrode current collector, followed by drying. The dry applied film may be rolled as necessary. That is, the negative electrode active material may be a material mixture layer. Alternatively, a lithium metal foil or a lithium alloy foil may be laminated on the negative electrode current collector. The negative electrode active material layer may be formed on one surface or both surfaces of the negative electrode current collector.

The negative electrode active material layer contains the negative electrode active material as an essential component, and may further include a binder, a conductive agent, a thickener, and the like, as optional components. For the binder, the conductive agent, and the thickener, known materials can be used.

The negative electrode active material includes a material that electrochemically absorbs or releases lithium ions, lithium metal, and/or a lithium alloy. As the material that electrochemically absorbs or releases lithium ions, a carbon material, a silicon-containing material, an alloy-type material, and the like can be used. Examples of the carbon material include graphite, graphitizable carbon (soft carbon), and non-graphitizable carbon (hard carbon). Particularly preferred is graphite, which is stable during charging and discharging and whose irreversible capacity is small. The alloy-type material contains, for example, at least one metal capable of forming an alloy with lithium, examples of which include silicon, tin, a silicon alloy, a tin alloy, and a silicon compound. These may be used in a form combined with oxygen, such as silicon oxide or tin oxide.

Examples of the silicon-containing materials or the alloy-type material include silicon oxide and a silicon-containing alloy compound, but are not limited thereto.

As the negative electrode current collector, a non-porous electrically conductive substrate (e.g., metal foil), and a porous electrically conductive substrate (e.g., mesh, net, punched sheet) are used. The material of the negative electrode current collector may be, for example, stainless steel, nickel, a nickel alloy, copper, a copper alloy, and the like.

[Liquid Electrolyte]

The liquid electrolyte contains a solvent and a solute dissolved in the solvent. The solute is an electrolyte salt that ionically dissociates in the liquid electrolyte. The solute can include, for example, a lithium salt. The components of the liquid electrolyte other than the solvent and solute are additives. The liquid electrolyte can contain various additives.

The solvent may be an aqueous solvent or a non-aqueous solvent. As the non-aqueous solvent, for example, a cyclic carbonic acid ester, a chain carbonic acid ester, a cyclic carboxylic acid ester, a chain carboxylic acid ester, and the like are used. Examples of the cyclic carbonic acid ester include propylene carbonate (PC), ethylene carbonate (EC), and vinylene carbonate (VC). Examples of the chain carbonic acid ester include diethyl carbonate (DEC), ethyl methyl carbonate (EMC), and dimethyl carbonate (DMC).

Examples of the cyclic carboxylic acid ester include $\gamma$-butyrolactone (GBL) and $\gamma$-valerolactone (GVL). Examples of the chain carboxylic acid ester include methyl acetate, ethyl acetate, propyl acetate, methyl propionate (MP), and ethyl propionate (EP). These non-aqueous solvents may be used singly or in combination of two or more kinds.

As the nonaqueous solvent, other than the above, cyclic ethers, chain ethers, nitriles, such as acetonitrile, amides, such as dimethylformamide, can be used.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether.

Examples of the chain ethers include 1,2-dimethoxyethane, dimethyl ether, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethyleneglycol dimethylether, diethyleneglycol diethylether, diethyleneglycol dibutylether, 1,1-dimethoxymethane, 1,1-diethoxyethane, triethyleneglycol dimethylether, and tetraethyleneglycol dimethylether.

These solvents may be a fluorinated solvent in which one or more hydrogen atoms are substituted by fluorine atom. As the fluorinated solvent, fluoroethylene carbonate (FEC) may be used.

Examples of the lithium salt include a lithium salt of a chlorine-containing acid (e.g., $LiClO_4$, $LiAlCl_4$, $LiB_{10}Cl_{10}$), a lithium salt of a fluorine-containing acid (e.g., $LiPF_6$, $LiPF_2O_2$, $LiBF_4$, $LiSbF_6$, $LiAsF_6$, $LiCF_3SO_3$, $LiCF_3CO_2$), a lithium salt of a fluorine-containing acid imide (e.g., $LiN(FSO_2)_2$, $LIN(CF_3SO_2)_2$, $LIN(CF_3SO_2)(C_4F_9SO_2)$, $LiN(C_2F_5SO_2)_2$), and a lithium halide (e.g., LiCl, LiBr, LiI). These lithium salts may be used singly or in combination of two or more kinds.

The concentration of the lithium salt in the liquid electrolyte may be 1 mol/liter or more and 2 mol/liter or less, and may be 1 mol/liter or more and 1.5 mol/liter or less. By controlling the lithium salt concentration in the above range, a liquid electrolyte having excellent ion conductivity and appropriate viscosity can be obtained. The lithium salt concentration is not limited to the above.

The liquid electrolyte may contain any other known additives. Examples of the additives include 1,3-propanesarton, methyl benzenesulfonate, cyclohexylbenzene, biphenyl, diphenyl ether, and fluorobenzene.

[Separator]

A separator is interposed between the positive electrode and the negative electrode. The separator is excellent in ion permeability and has moderate mechanical strength and electrically insulating properties. As the separator, for example, a microporous thin film, a woven fabric, a nonwoven fabric, and the like can be used. A preferred material of the separator is polyolefin, such as polypropylene and polyethylene.

In an exemplary structure of the secondary battery, an electrode group formed by winding a positive electrode and a negative electrode with a separator interposed therebetween is housed together with a nonaqueous electrolyte in an outer body. The wound-type electrode group may be replaced with a different form of the electrode group, such as a stacked-type electrode group formed by stacking a positive electrode and a negative electrode with a separator interposed therebetween. The secondary battery may be of any type, such as a cylindrical, prismatic, coin, button, or laminate type.

FIG. 1 is a partially cut-away schematic oblique view of a prismatic nonaqueous secondary battery according to an embodiment of the present disclosure.

The battery includes a bottomed prismatic battery case 11, and an electrode group 10 and a nonaqueous electrolyte (not shown) housed in the battery case 11. The electrode group 10 has a long negative electrode, a long positive electrode, and a separator interposed therebetween and preventing them from directly contacting with each other. The electrode group 10 is formed by winding the negative electrode, the positive electrode, and the separator around a flat plate-like winding core, and then removing the winding core.

To the negative electrode current collector of the negative electrode, a negative electrode lead 15 is attached at its one end, by means of welding or the like. To the positive electrode current collector of the positive electrode, a positive electrode lead 14 is attached at its one end, by means of welding or the like. The negative electrode lead 15 is electrically connected at its other end to a negative electrode terminal 13 disposed at a sealing plate 12. A gasket 16 is disposed between the sealing plate 12 and the negative electrode terminal 13, providing electrical insulation therebetween. The positive electrode lead 14 is connected at its other end to the sealing plate 12, and electrically connected to the battery case 11 serving as a positive electrode terminal. A resin frame 18 that separates the electrode group 10 from the sealing plate 12 and also separates the negative electrode lead 15 from the battery case 11 is disposed above the electrode group 10. The opening of the battery case 11 is sealed with the sealing plate 12. The sealing plate 12 is provided with a liquid inlet 17a, and the electrolyte is injected through the liquid inlet 17a into the prismatic battery case 11. The liquid inlet 17a is then closed with a sealing plug 17.

The structure of the secondary battery may be of a cylindrical shape, a coin shape, a button shape or the like including a battery case made of metal, and may be of a laminate type including a battery case made of a laminated sheet which is a laminate of a barrier layer and a resin sheet. In the present disclosure, the type, shape, and the like of the secondary battery are not limited.

The present disclosure will be specifically described below with reference to Examples and Comparative Examples. It is to be noted, however, the present disclosure is not limited to the following Examples.

EXAMPLE 1

[Production of Negative Electrode]

Graphite serving as a negative electrode active material, sodium carboxymethylcellulose (CMC-Na), styrene-butadiene rubber (SBR), and water were mixed in a predetermined mass ratio, to prepare a negative electrode slurry. Next, the negative electrode slurry was applied onto a surface of a copper foil serving as a negative electrode current collector, and the applied film was dried, and then rolled, to form a negative electrode mixture layer on each of both surfaces of the copper foil.

[Synthesis of First Positive Electrode Active Material]

$[Ni_{0.88}Co_{0.09}Al_{0.03}](OH)_2$ synthesized by a coprecipitation method and LiOH were mixed in a molar ratio between Li and the sum of Ni, Co and Al of 1.1:1.0, with Ishikawa's grinding mortar. The mixture was then fired in an oxygen atmosphere, to obtain a first positive electrode active material in which the ratio of the D90 diameter to the D10 diameter was 2.5 or more.

[Synthesis of Second Positive Electrode Active Material]

$[Ni_{0.88}Co_{0.09}Al_{0.03}](OH)_2$ synthesized by a coprecipitation method and LiOH were mixed in a molar ratio between Li and the sum of Ni, Co and Al of 1.1:1.0, with Ishikawa's grinding mortar. The mixture was then fired in an oxygen atmosphere, to obtain a second positive electrode active material in which the ratio of the D90 diameter to the D10 diameter was less than 2.5.

[Production of Positive Electrode]

The first positive electrode active material, the second positive electrode active material, acetylene black, polyvinylidene fluoride, and N-methyl-2-pyrrolidone (NMP) were mixed in a predetermined mass ratio so that the mass ratio between the first positive electrode active material and the second positive electrode active material became 8:2, to prepare a first positive electrode slurry. Similarly, the first positive electrode active material, the second positive electrode active material, acetylene black, polyvinylidene fluoride, and N-methyl-2-pyrrolidone (NMP) were mixed in a predetermined mass ratio so that the mass ratio between the first positive electrode active material and the second positive electrode active material became 2:8, to prepare a second positive electrode slurry.

Next, the second positive electrode slurry was applied onto a surface of an aluminum foil serving as a positive electrode current collector, and the first positive electrode slurry was further applied thereon. The applied amounts of the first positive electrode slurry and the second positive electrode slurry were set the same. The applied films were dried, and then rolled, to form a positive electrode mixture layer having a first positive electrode mixture layer (upper layer) containing the first positive electrode active material and a second positive electrode mixture layer (lower layer) containing the second positive electrode active material, on each of both surfaces of the aluminum foil. The density after rolling of the positive electrode mixture layer as a whole, including the first and second positive electrode mixture layers, was 3.6 g/cm³. The thicknesses of the first positive electrode mixture layer and the second positive electrode mixture layer were approximately the same. Therefore, the first positive electrode mixture layer corresponded to the first region, and the second positive electrode mixture layer corresponded to the second region.

A cross section of the positive electrode mixture layer was formed by a cross-section polisher (CP) processing, to perform cross-section observation of each of the first positive electrode mixture layer and the second positive electrode mixture layer with a SEM. The crack ratios in the first positive electrode mixture layer (first region) and the second positive electrode mixture layer (second region) were determined by the already-described method. The result found that the crack ratio in the first positive electrode mixture layer (first region) was 0.44 (44%), and the crack ratio in the second positive electrode mixture layer (second region) was 0.53 (53%).

[Preparation of Liquid Electrolyte]

LiPF$_6$ was added as a lithium salt in a mixed solvent containing ethyl methyl carbonate (EMC) and ethylene carbonate (EC) in a volume ratio of 70:30, to prepare a liquid electrolyte. The concentration of $LiPF_6$ in the nonaqueous liquid electrolyte was set to 1.0 mol/liter.

[Fabrication of Secondary Battery]

A lead tab was attached to each electrode, and the positive electrode and a lithium metal foil serving as a counter electrode were spirally wound with a separator interposed therebetween, such that the lead was placed at the outermost layer, to prepare an electrode group. The electrode group was inserted into an outer body made of a laminated film having an aluminum foil as a barrier layer, and vacuum-dried at 105° C. for 2 hours, and then, the nonaqueous liquid electrolyte was injected thereinto. The opening of the outer body was sealed, to complete a battery A1 for evaluation.

COMPARATIVE EXAMPLE 1

In the production of a positive electrode, only the first positive electrode slurry was applied, and the applied film was dried, and then rolled, to form a positive electrode mixture layer having the first positive electrode mixture layer on each of both surfaces of the aluminum foil. The applied amount of the first positive electrode slurry was set the same as the sum of the applied amounts of the first and second positive electrode slurries in Example 1.

Except for the above, a secondary battery was produced in the same manner as in Example 1, to obtain a battery B1 for evaluation.

A cross section of the positive electrode mixture layer was formed by a cross-section polisher (CP) processing, to perform cross-section observation of the first positive electrode mixture layer with a SEM. The crack ratio in the first positive electrode mixture layer was determined by the already-described method. The result found that the crack ratio in the first positive electrode mixture layer was 0.47 (47%).

COMPARATIVE EXAMPLE 2

In the production of a positive electrode, only the second positive electrode slurry was applied, and the applied film was dried, and then rolled, to form a positive electrode mixture layer having the second positive electrode mixture layer on each of both surfaces of the aluminum foil. The applied amount of the second positive electrode slurry was set the same as the sum of the applied amounts of the first and second positive electrode slurries in Example 1.

Except for the above, a secondary battery was produced in the same manner as in Example 1, to produce a battery B2 for evaluation.

A cross section of the positive electrode mixture layer was formed by a cross-section polisher (CP) processing, to perform cross-section observation of the second positive electrode mixture layer with a SEM. The crack ratio in the second positive electrode mixture layer was determined by the already-described method. The result found that the crack ratio in the second positive electrode mixture layer was 0.5 (50%).

EXAMPLE 2

In the production of a positive electrode, the first positive electrode slurry was applied onto a surface of an aluminum foil serving as a positive electrode current collector, and then, the second positive electrode slurry was further applied thereon. The applied amounts of the first positive electrode slurry and the second positive electrode slurry were the same as those in Example 1, respectively. The applied films were dried, and then rolled, to form a positive electrode mixture layer having a first positive electrode mixture layer (lower layer) containing the first positive electrode active material and a second positive electrode mixture layer (upper layer) containing the second positive electrode active material, on each of both surfaces of the aluminum foil. In the present Example, the laminating order of the first positive electrode mixture layer and the second positive electrode mixture layer was reversed, and the first positive electrode mixture layer was on the positive electrode current collector side. The density after rolling of the positive electrode mixture layer as a whole, including the first and second positive electrode mixture layers, was 3.6 g/cm³. The thicknesses of the first positive electrode mixture layer and the second positive electrode mixture layer were approximately the same, and the first positive electrode mixture layer and the second positive electrode mixture layer corresponded to the first region and the second region, respectively.

Except for the above, a secondary battery was produced in the same manner as in Example 1, to obtain a battery A2 for evaluation.

A cross section of the positive electrode mixture layer was formed by a cross-section polisher (CP) processing, to perform cross-section observation of each of the first positive electrode mixture layer and the second positive electrode mixture layer with a SEM. The crack ratios in the first positive electrode mixture layer (first region) and the second positive electrode mixture layer (second region) were determined by the already-described method. The result found that the crack ratio in the first positive electrode mixture layer (first region) was 0.44 (44%), and the crack ratio in the second positive electrode mixture layer (second region) was 0.53 (53%).

EXAMPLE 3

In the production of a positive electrode, the second positive electrode slurry was applied onto a surface of an aluminum foil serving as a positive electrode current collector, dried, rolled and then, the first positive electrode slurry was further applied thereon. The applied amounts of the first positive electrode slurry and the second positive electrode slurry were the same as those in Example 1, respectively. The applied films were dried, and then rolled again, to form a positive electrode mixture layer having a first positive electrode mixture layer (upper layer) containing the first positive electrode active material and a second positive electrode mixture layer (lower layer) containing the second positive electrode active material, on each of both surfaces of the aluminum foil. The density after rolling of the positive electrode mixture layer as a whole, including the first and second positive electrode mixture layers, was 3.6 g/cm³. The thicknesses of the first positive electrode mixture layer and the second positive electrode mixture layer were approximately the same, and the first positive electrode mixture layer and the second positive electrode mixture layer corresponded to the first region and the second region, respectively.

Except for the above, a secondary battery was produced in the same manner as in Example 1, to obtain a battery A3 for evaluation.

A cross section of the positive electrode mixture layer was formed by a cross-section polisher (CP) processing, to perform cross-section observation of each of the first positive electrode mixture layer and the second positive electrode mixture layer with a SEM. The crack ratios in the first positive electrode mixture layer (first region) and the second positive electrode mixture layer (second region) were determined by the already-described method. The result found that the crack ratio in the first positive electrode mixture layer (first region) was 0.40 (40%), and the crack ratio in the second positive electrode mixture layer (second region) was 0.60 (60%).

[Evaluation]

(Initial Charging and Discharging)

Each of the completed batteries was placed in a 25° C. environment, and was constant-current charged at a current of 0.3 It until the voltage reached 4.3 V, and then, constant-voltage charged at a constant voltage of 4.3 V until the current reached 0.02 It. Then, the battery was constant-current discharged at a current of 0.5 It until the voltage dropped to 2.5 V, to determine an initial capacity $C_0$. The charging and discharging were performed in a 25° C. environment.

(Capacity Retention Rate)

With the rest time between charging and discharging set to 10 minutes, in a 25° C. environment, charging and discharging were repeated 20 cycles under the above charge-discharge conditions, to determine a discharge capacity $C_1$ at the 20th cycle. A deterioration rate R calculated using the discharge capacity $C_1$ and the initial discharge capacity $C^0$ from the following equation was evaluated.

$$\text{Deterioration rate } R\,(\%) = \left(1 - C_1/C_0\right) \times 100$$

The evaluation results of the deterioration rate R for batteries A1 to A3, B1, and B2 are shown in Table 1. In Table 1, the crack ratio (%) of the positive electrode active material in the positive electrode mixture layer used in each battery is also shown. Table 1 shows that in the batteries A1 to A3 in which the positive electrode mixture layer was formed in two layers of a first positive electrode mixture layer containing a first positive electrode active material, and a second positive electrode mixture layer containing a second positive electrode active material, and the crack ratio was differed between the layers, as compared to in the batteries B1 and B2 in which the positive electrode mixture layer was formed in one layer of the first or second positive electrode mixture layer, the deterioration in cycle characteristics was suppressed, and the deterioration rate was lowered. In the battery A1 in which the first positive electrode active material was disposed on the surface side (upper layer) and the second positive electrode active material was disposed on the current collector side (lower layer) in the positive electrode mixture layer so that the crack ratio on the surface layer side becomes smaller that on the current collector side, the deterioration rate was low even compared to in the battery A2 in which the first positive electrode active material was disposed on the current corrector side and the second positive electrode active material was disposed on the surface side in the positive electrode mixture layer. A presumable reason why the deterioration rate of the battery B1 was higher than that of the battery B2 was that an active material with a low crack ratio was much contained in the battery B1, and cracks occurred significantly in an active material with a high crack rate which was contained in a small amount, and these resulted in a particularly high deterioration rate.

TABLE 1

| | positive electrode active material crack ratio | | deterioration rate |
| | upper layer | lower layer | R/[%] |
|---|---|---|---|
| A1 | 44% | 53% | 2.7 |
| A2 | 53% | 44% | 3.0 |
| A3 | 40% | 60% | 2.5 |
| B1 | 47% | | 4.1 |
| B2 | 50% | | 3.6 |

INDUSTRIAL APPLICABILITY

According to the secondary battery according to the present disclosure, it is possible to provide a nonaqueous electrolyte secondary battery having high capacity and excellent cycle characteristics. The secondary battery according to the present disclosure is useful as a main power source for mobile communication devices, portable electronic devices, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: nonaqueous electrolyte secondary battery, 10: electrode group, 11: battery case, 12: sealing plate, 13: negative electrode terminal, 14: positive electrode lead, 15: negative electrode lead, 16: gasket, 17: sealing plug, 17a: liquid inlet, 18: frame, 23A to 23E, 24A, 24B: positive electrode active material particle

The invention claimed is:

1. A positive electrode for a secondary battery, comprising:

a positive electrode current collector; and a positive electrode mixture layer containing a positive electrode active material and disposed on a surface of the positive electrode current collector, wherein the positive electrode mixture layer contains a first positive electrode active material, and a second positive electrode active material crushable more easily than the first positive electrode active material, when the positive electrode mixture layer is zoned into a first region and a second region having the same thickness, the first positive electrode active material is contained more in the first region than in the second region, and the second positive electrode active material is contained more in the second region than in the first region, and a crack ratio RC2 of the positive electrode active material in the second region is 1.2 times or more as large as a crack ratio RC1 of the positive electrode active material in the first region.

2. The positive electrode for a secondary battery according to claim 1, wherein the crack ratio RC2 of the positive electrode active material in the second region is 1.5 times or more as large as the crack ratio RC1 of the positive electrode active material in the first region.

3. The positive electrode for a secondary battery according to claim 1, wherein the crack ratio RC2 of the positive electrode active material in the second region is 70% or less.

4. The positive electrode for a secondary battery according to claim 1, wherein the second region is nearer to the positive electrode current collector than the first region.

5. A secondary battery comprising:

the positive electrode for a secondary battery according to claim 1;

a separator; a negative electrode facing the positive electrode for a secondary battery with the separator interposed between the positive electrode and the negative electrode; and a liquid electrolyte.

6. A method for producing the positive electrode for a secondary battery according to claim 1, the method comprising:

a step of preparing a positive electrode current collector; and a step of disposing a positive electrode mixture layer including a first layer and a second layer, on a surface of the positive electrode current collector;

the step of disposing the positive electrode mixture layer including a step of forming the second layer on the surface of the positive electrode current collector, and a step of forming the first layer on the second layer, wherein the first layer contains at least a first positive electrode active material, and the second layer contains at least a second positive electrode active material crushable more easily than the first positive electrode active material.

7. The method for producing the positive electrode for a secondary battery according to claim 6, further comprising a step of, after forming the second layer, compressing the second layer together with the positive electrode current collector.

8. The method for producing the positive electrode for a secondary battery according to claim 6, wherein a ratio of a D90 diameter to a D10 diameter of the first positive electrode active material is larger than a ratio of a D90 diameter to a D10 diameter of the second positive electrode active material.

* * * * *